United States Patent [19]
Farber et al.

[11] 3,883,557
[45] May 13, 1975

[54] TRIMETHYLFLUORAN COMPOUNDS

[75] Inventors: Sheldon Farber, Appleton, Wis.;
Arthur J. Wright, Jamestown, Ohio

[73] Assignee: NCR Corporation, Dayton, Ohio

[22] Filed: June 26, 1974

[21] Appl. No.: 484,021

Related U.S. Application Data

[60] Division of Ser. No. 383,218, July 27, 1973, abandoned, which is a continuation-in-part of Ser. No. 340,799, March 13, 1973, abandoned, which is a continuation-in-part of Ser. No. 243,871, April 13, 1972, abandoned.

[52] U.S. Cl. ............... 260/335; 117/36.2; 117/36.8
[51] Int. Cl. ............................................. C07d 7/42
[58] Field of Search ................................. 260/335

[56] References Cited
UNITED STATES PATENTS

| | | | |
|---|---|---|---|
| 3,442,908 | 5/1969 | Orita et al. | 260/335 |
| 3,506,471 | 4/1970 | Kimura et al. | 260/335 |
| 3,642,828 | 2/1972 | Farber et al. | 260/335 |
| 3,691,203 | 9/1972 | Koga et al. | 260/335 |

*Primary Examiner*—Norma S. Milestone
*Attorney, Agent, or Firm*—E. Frank McKinney; Robert J. Shafer

[57] ABSTRACT

Colorless, but colorable trimethylfluoran compounds are disclosed, which are represented by the formula

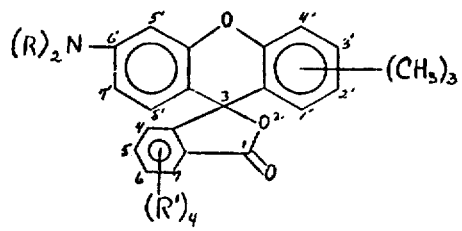

wherein each R is hydrogen, phenyl, benzyl, cyclohexyl, or an alkyl having one to five carbon atoms and R' is hydrogen or chlorine. These compounds are used in pressure-sensitive record material and in markforming manifold systems.

2 Claims, No Drawings

TRIMETHYLFLUORAN COMPOUNDS

This invention relates to colorless, but colorable compounds. More specifically, this invention relates to trimethylfluorans. These compounds are employed in pressure-sensitive record material and in mark-forming manifold systems.

These compounds are colorless or substantially colorless when in liquid solution, but are converted to dark-colored forms upon reactive contact with an acidic material. In pressure-sensitive mark-forming systems, the unreacted mark-forming components (the colorless, but colorable compound and the acidic material) and a liquid solvent in which each of the mark-forming components is soluble is disposed on or within a sheet support material. The liquid solvent is present in such form that is maintained isolated by a pressure-rupturable barrier from at least one of the mark-forming components until the application of pressure causes a breach of the barrier in the area delineated by the pressure pattern. The application of pressure brings the mark-forming components into reactive contact, thereby producing a distinctive mark.

U.S. Pat. No. 3,506,471 discloses fluorans such as 3-diethylamino-5,6-dimethylfluoran and U.S. Pat. No. 3,442,908 discloses fluorans such as 2-chloro-1,3-dimethyl-6-diethylaminofluoran.

Colorless, but colorable trimethylfluoran compounds now have been invented.

Accordingly, an object of this invention is to provide colorless, but colorable trimethylfluorans.

Other objects, aspects and advantages of this invention will be apparent to one skilled in the art from the following disclosure and appended claims.

The colorless, but colorable trimethylfluorans of this invention are represented by the formula:

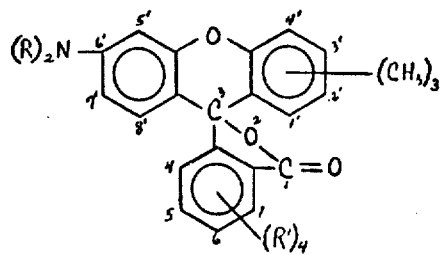

wherein each R is hydrogen, phenyl, benzyl, cyclohexyl, or an alkyl having one to five carbon atoms and R' is hydrogen or chlorine. Preferably each R is hydrogen or methyl or ethyl.

A few specific examples of these trimethylfluorans are:

a. 1', 2',3'-trimethyl-6'-diethylaminofluoran represented by the structure:

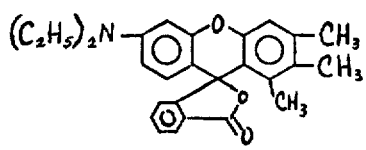

b. 1',2',3'-trimethyl-6'-dimethylaminofluoran represented by the structure:

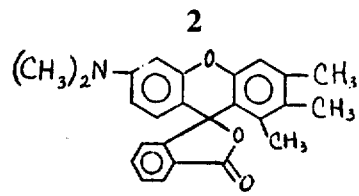

c. 4,5,6,7-tetrachloro-1',2',3'-trimethyl-6'-diethylaminofluoran represented by the structure:

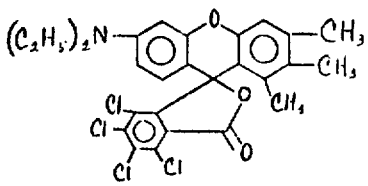

d. 1',3',4'-trimethyl-6'-diethylaminofluoran represented by the structure:

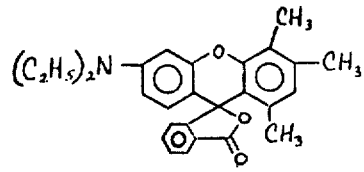

e. 1',2',3'-trimethyl-6'-benzylaminofluoran represented by the structure:

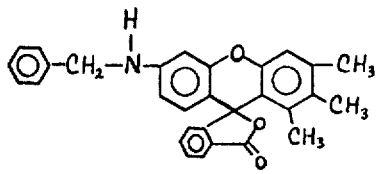

f. 1',3',4'-trimethyl-6'-benzylaminofluoran represented by the structure:

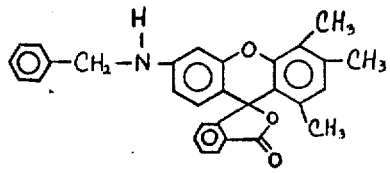

g. 1',3',4'-trimethyl-6'-dimethylaminofluoran represented by the structure:

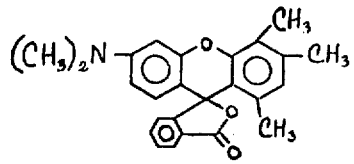

h. 4,5,6,7-tetrachloro-1',3',4'-trimethyl-6'-diethylaminofluoran represented by the structure:

[Chemical structure: a xanthene/fluoran compound with (C₂H₅)₂N group, three CH₃ substituents, and (Cl)₄ on the phthalide ring]

The colors developed from these trimethylfluorans are reds, oranges, yellows, orange-reds, and the like.

In a preferred embodiment of this invention, the trimethylfluoran and liquid solvent are encapsulated in microscopic capsules which are coated on base sheet record material. In close contact with the base sheet record material is a sensitized undersheet. The base sheet yields the trimethylfluoran under pressure of writing against the sensitized undersheet in a pattern of droplets corresponding to the written matter, in accordance with the disclosure of such a capsule-bearing sheet in U.S. Pat. No. 2,712,507 which issued July 5, 1955, on the application of Barrett K. Green. U.S. Pat. No. 2,712,507 also discloses a preferred method of forming the capsules. Other preferred methods for preparing solvent-containing microscopic capsules are disclosed in U.S. Pat. No. 2,800,457 which issued on July 23, 1957, on the application of Barrett K. Green and Lowell Schleicher and in U.S. Pat. No. 3,041,289, which issued on June 26, 1962, on the application of Bernard Katchem and Robert E. Miller.

The encapsulated droplets are released by the rupture of capsules in writing operations. The trimethylfluoran liquid droplets are transferred in the pattern of the data configuration to the top of the underlying sheet. The top of the underlying sheet is coated or impregnated with at least one material which is an acid reactant with respect to trimethylfluoran and produces color with any such component that is reactive therewith. Representative acidic coating materials are, on one hand, oil-insoluble minerals or inorganic particulate solid material, represented by kaolin, attapulgite, silica gel, zeolites, and the like, and, on the other hand, organic polymeric acidic materials, such as acid-reacting phenolic resins of oil-soluble characteristics.

The record member consists of a base sheet or web member either of fibrous construction, such as paper, or of continuous structure, such as films of organic polymer material, carrying the color reactant in an exposed state with respect to applied liquid. The acid reactant, when of particulate nature, is arranged in intimate juxtaposition to form an apparently unbroken liquid receptive surface, yet substantially each particle individually is available for contact with applied liquid.

Polymeric materials of sufficient activity in an acid sense and suitable for use in this invention because they are oil-soluble are disclosed in a continuation application for U.S. Letters Patent, Ser. No. 744,601, filed June 17, 1968, based on application for United States Letters Patent, Ser. No. 392,404, filed Aug. 27, 1964, by Robert E. Miller and Paul S. Phillips, Jr.

Among the oil-soluble organic polymeric materials suitable for use in this invention together with appropriate solvents to be used therewith, acid-reaction phenol-aldehyde and phenol-acetylene polymers, maleic acid-rosin resins partially or wholly hydrolyzed styrene-maleic anhydride copolymers and ethylene-maleic anhydride copolymers, carboxy polymethylene (Carbopol 934), and wholly or partially hydrolyzed vinyl methyl ether-maleic anhydride copolymer are specified as typical of the reactive acidic polymeric materials.

Among the phenol-aldehyde polymers found useful are members of the type commonly referred to as novolaks, which are characterized by solubility in common organic solvents and which are, in the absence of cross-linking agents, permanently fusible. Another group of useful phenol polymeric materials are alkylphenol-acetylene resins, likewise soluble in common organic solvents and possessing permanent fusibility in the absence of being treated by cross-linking materials. Generally, the phenolic polymer materials useful in practicing this invention are characterized by the presence of free hydroxyl groups and by the absence of groups, such as methylol, which tend to promote infusibility or cross-linking of the polymer, and by their solubility in organic solvents and relative insolubility in aqueous media.

A laboratory method useful in the selection of suitable phenolic resins is a determination of the infrared radiation absorption pattern of a candidate material. It has been found that phenolic resins showing an absorption in the 3,200–3,500 $cm^{-1}$ region (which is indicative of the free hydroxyl groups) and not having an absorption in the 1,600–1,700 $cm^{-1}$ region are suitable. The latter absorption region is indicative of the desensitization of the hydroxyl groups and consequently makes such groups unavailable for reaction with the chromogenic material to be specified.

The liquid solvent portion of this invention is capable of dissolving the mark-forming components. The solvent can be volatile or nonvolatile, and a single or multiple component solvent which is wholly or partly volatile can be used. Examples of volatile solvents useful with the trimethylfluoran and acidic polymer mark-forming components specified are toluene, petroleum distillate, perchloroethylene, and xylene. Examples of nonvolatile solvents are high-boiling-point petroleum fractions and chlorinated diphenyls.

Generally, the solvent forming the vehicle to a large extent should be chosen so as to be capable of dissolving at least 1%, on a weight basis, of the trimethylfluoran, preferably in excess of 2%, and a larger amount of polymeric material—up to, say 15% or more—to form an efficient reaction. However, in the preferred system, the solvent should be capable of dissolving an excess of the polymeric material, so as to provide every opportunity for maximum reaction utilization of the trimethylfluoran and thus to assure the maximum coloration at a reaction site.

A further criterion of the selected solvent is that it must not interfere with the mark-forming reaction. In some instances, the presence of the solvent may interfere with the mark-forming reaction or diminish the intensity of the mark, in which case the solvent chosen should be sufficiently vaporizable to assure its leaving the reaction site after having, through solution, brought the mark-forming components into intimate admixture, so that the mark-forming reaction proceeds.

In the base-acid color system, as stated above, the polymeric mark-forming component(s) chosen must be acidic relative to the trimethylfluoran compound and reactive with the trimethylfluoran material to effect the distinctive color formation or color change.

Kaolin is generally known and used in the papermaking industry as "china clay" and is outstandingly preferable as a particulate oil-insoluble and water-insoluble mineral material of acid characteristics necessary to color the trimethylfluoran of this invention. A white kaolin is used, and, because of its whiteness, its plate-like particle form, which gives it unparallelled coating properties in aqueous slurries, its unversal abundance in supply, its historical general usage in the papermaking and paperconverting industries, and its low cost, it is an ideal material. Other types of particulate and substantially colorless water- and oil-insoluble minerals of the necessary acid properties are deemed equivalents of kaolin, some being bentonites.

Attapulgite can be used in this invention as an efficient colorless mineral reactant material to color the naphthalides of this invention that react on contact in an electron-donor-acceptor reaction, and, by reason of its high oil absorbency, is double useful as an absorbent reactant coating on paper to form color with such compounds dissolved in oil as may be applied to it.

Various methods known to the prior art and disclosed in the aforementioned application Ser. No. 392,404 to Miller, et al. and U.S. Patent application Ser. No. 420,193 to Phillips, et al. can be employed in coating compositions of the mark-forming materials into their supporting sheets. An example of the compositions which can be coated onto the surface of an underlying sheet of a two-sheet system to react with the capsule coating on the underside of an overlying sheet is as follows:

| Coating Composition | Percent by Weight |
| --- | --- |
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

All of the above-described materials, solvents, systems and the like, except for the trimethylfluorans of this invention, are further described in U.S. Pat. No. 3,491,117.

The advantages of this invention are further illustrated by the following examples. The reactants and the proportions and other specific conditions are presented as being typical and should not be construed to limit the invention unduly.

EXAMPLE I

Preparation of 1',2',3'-trimethyl-6'-diethylamino fluoran

A mixture of 46.95 g. (0.15 mole) of 4-diethylamino-2-hydroxy-2'-carboxybenzophenone, 20.4 g. (0.15 mole) of 3,4,5-trimethylphenol and 300 ml. of 78% sulfuric acid were stirred at 75° C. for one-half hour, poured into ice, dilute ammonia added until basic and heated on a steam bath until the initially gummy precipitate became granular. The precipitate was filtered, digested in hot alcohol, cooled in an ice bath and filtered 29.9 g. (48%), mp 194°–196° C. Two recrystallizations from toluene-petroleum ether gave a constant mp of 196°–197° C. When a solution of this material was brought into contact with a sheet of paper coated with phenolic resin or clay, a bright orange-red color was obtained. Calc'd. percentages for $C_{27}H_{27}NO_3$ : C, 78.42; H, 6.58; N, 3.39. Found percentages: C, 78.27; H, 6.60; N, 3.44.

EXAMPLE II

Preparation of 1',2',3'-trimethyl-6'-dimethylamino fluoran

A mixture of 28.5 g. (0.1 mole)-4-dimethyl-amino-2-hydroxy-2'-carboxy-benzophenone, 13.6 g. (0.1 mole) 3,4,5-trimethylphenol and 200 ml. of 78% sulfuric acid was stirred for one-half hour at 75° C., poured into ice and made basic with ammonia. Filtered while still warm and recrystallized from dimethylformamide-water, 29.0 g. (76.5%) of material obtained. Three more recrystallizations from dimethylformamide-water afforded an mp of 279°–280° C. When a benzene solution of this material was brought into contact with a sheet of paper coated with phenolic resin, a bright reddish-orange color was obtained. Anal. by percent Calc'd. for $C_{25}H_{23}NO_3$ : C, 77.90; H, 6:01;N, 3.63. Found: C, 77.69; H, 6.00;N, 3.50.

EXAMPLE III

Preparation of 4,5,6,7-tetrachloro-1',2',3'trimethyl-6'-diethylamino fluoran

A few mgs. of 3',4',5',6'-tetrachloro-2'-carboxy-4-diethylamino-2-hydroxybenzophenone and a few mgs. of 3,4,5-trimethylphenol were combined with conc. sulfuric acid, heated up to 85° briefly, water added then basified with ammonia and extracted with toluene. The toluene when applied to a paper sheet coated with phenolic resin or clay gave a blood red color.

EXAMPLE IV

Preparation of 1',3',4'-trimethyl-6'-diethylamino fluoran

A mixture of 49.95 g. (0.15 mole) of 4-diethylamino-2-hydroxy-2'-carboxybenzophenone, 20.4 g. (0.15 mole)2,3,5 trimethylphenol and 300 ml. of 78% sulfuric acid was stirred at 75° C. for one-hour and poured into ice. The solution was basified and the insolubles filtered and extracted with hot toluene. The toluene was diluted with petroleum ether and the precipitate filtered. Recrystallized from toluene and again from toluene-petroleum-ether. Digestion in hot alcohol removed some of the color. A yield of 24.0 g. of material (39%) mp 233°–236° C. was obtained. A sample was recrystallized three times from dimethylformamide-water and an elemental analysis was done. When a solution of this material is brought into contact with a sheet of paper coated with phenolic resin or with clay, a bright orange color is obtained. Calc'd. percentages for $C_{27}H_{27}NO_3$ : C, 78.42; H, 6.58; N, 3.39. Found percentages: C, 78.31; H, 6.56; N, 3.46.

EXAMPLE V

Preparation of -trimethyl-1',3',4'-TRIMETHYL-6'-dimethylamino fluoran

A mixture of 28.5 g. (0.1 mole) 4-dimethylamino-2-hydroxy-2'-carboxybenzophenone, 13.6 g. (0.1 mole) of 2,3,5-trimethylphenol and 200 ml. of sulfuric acid were mixed and gradually heated to 75° and heated at that temperature for an hour. Poured into ice and basified with concentrated ammonia allowing the mixture to warm up to 90° C. The product was filtered and digested in hot toluene to afford 33.3 g. (87%) of material. Repeated recrystallization gave a constant mp of 292°–295° C. When a solution of this material was brought into contact with a sheet of paper coated with phenolic resin or clay, a brilliant orange color was obtained. Anal. by percent Calc'd. for $C_{25}H_{23}NO_3$: C, 77.90; H, 6.01; N, 3.63. Found: C, 77.76; H, 6.06; N, 3.53.

EXAMPLE VI

Preparation of 4,5,6,7-tetrachloro-1',3',4'-trimethyl-6'-diethylamino fluoran.

A mixture of 22.5 g. (0.05 mole) of 3',4',5',6'-tetrachloro-2'-carboxy-4-diethylamino-2-hydroxybenzophenone, 6.8 g. (0.05 mole) of 2,3,5-trimethyl phenol and 100 ml. of 78% sulfuric acid was stirred at 80°–90° C. for one-half hour and allowed to come to room temperature slowly and then stirred over night. The solution was basified with concentrated ammonia and allowed to warm up. Acetone was added to this mixture and 26.5 g. of crude material obtained which was recrystallized from dimethylformamide-water. A yield of 20.2 g. (73%) was obtained. Two recrystallizations from chloroform-petroleum ether gave a constant mp of 127.5°–128.5° C. This compound was characterized by a carbonyl bond in the ir spectrum at 1,770 cm$^{-1}$ and the nmr spectrum, nmr (CDCl$_3$)δ 1.18 (t, 6, J = 7HZ CH$_2$–CH$_3$), 1.82(S, 3 aromatic methyl), 2.30 (δ, 3, aromatic methyl), 2.42 (δ, 3, aromatic methyl), 3.39(m, 4, J = 4, CH$_2$–CH$_3$), 6.35–6.78 (m, 3, aromatic protons). When a solution of this material was brought into contact with a paper sheet coated with phenolic resin or clay, a bright red color was obtained.

EXAMPLE VII

Employing the compounds prepared in Examples IV and V, prints were made on paper sheets sensitized with (a)p-phenylphenolformaldehyde resin, (b) silton and (c) zinc modified p-phenylphenolformaldehyde resin. Reflectance intensities were obtained on the fresh prints and on the prints after 4 hours exposure in a daylight fluorescence box. The reflectance values in the following table represent a ratio of the intensity of color to the intensity of the background. A value of 1.000 would indicate a white color. If the reflectance value increases with time, the print fades. Compounds which exhibit good fade resistance will demonstrate small increases in reflectance values with the passage of time. The obtained reflectance values were:

| | 1',3',4'-trimethyl-6'-diethylaminofluoran* | | 1',3',4'-trimethyl-6'-dimethylaminofluoran | |
|---|---|---|---|---|
| Sensitized Sheet | Fresh Print | 4 Hour Old Print | Fresh Print | 4 Hour Old Print |
| (a) | 0.149 | 0.181 | 0.161 | 0.152 |
|  | 0.130 | 0.161 |  |  |
| (b) | 0.070 | 0.097 | 0.056 | 0.092 |
|  | 0.060 | 0.081 |  |  |
| (c) | 0.212 | 0.174 | 0.170 | 0.170 |

*Note, two different runs were carried out in some instances. These two compounds exhibit small increases in reflectance values over a 4 hour period of time, thereby exhibiting good fade resistance. In some instances, the reflectance values even increased with time.

EXAMPLE VIII

The "visual efficiency" or "hiding power" of various color reactants were measured. The area between the reflectance of the substrate and the reflectance of the color reactants on the substrate between 400 and 700 millimicrons was used as the measure of the "hiding power" of the color reactant. The color reactants of Examples I, II, IV and V of this invention, the 3-diethylamino-5,6-dimethylfluoran of U.S. Pat. No. 3,506,471 and the 2-chloro-1,3-dimethyl-6-diethylaminofluoran of U.S. Pat. No. 3,442,908 were tested. The substrate, resins, solvents and related conditions were identical for all reactants tested. The measured areas are given in the following table:

| Reactant | Area in Square Inches |
|---|---|
| 1',3',4'-trimethyl-6'-diethylaminofluoran | 33.1 and 31.9* |
| 1',2',3'-trimethyl-6'-diethylaminofluoran | 33.1 |
| 1',3',4'-trimethyl-6'-dimethylaminofluoran | 30.1 |
| 1',2',3'-trimethyl-6'-dimethylaminofluoran | 32.9 |
| 2-chloro-1,3-dimethyl-6'-diethylaminofluoran | 15.7 |
| 3-diethylamino-5,6-dimethylfluoran | 25.1 |

*Two different runs were carried out.

The trimethyl-fluorans of this invention demonstrate excellent "visual efficiency" or "hiding power." Further, the "hiding power" of these compounds is superior to the "hiding power" of two compounds known in the art.

Although this invention has been described in considerable detail, it must be understood that such detail is for the purposes of illustration only and that many variations and modifications can be made by one skilled in the art without departing from the scope and spirit thereof.

EXAMPLE IX

Preparation of 1',2',3'-trimethyl-6'-benzylamino fluoran

A mixture of 33.1 g. (0.1 mole) 4-benzylamino-2-hydroxy-2'-carboxybenzophenone, 13.6 g. (0.1 mole) 3,4,5-trimethylphenol and 200 ml. of 78% sulfuric acid was established in an ice bath, permitted to warm to room temperature and stirred for 2 hours. The reaction mixture was poured into ice and toluene and the mixture was made basic by addition of ammonia and ice. The basic mixture was extracted using toluene. The toluene was washed with water, dried using NaSO$_4$ and evaporated to yield 6.3 g. (14%) of material exhibiting a melting point of 222°–223.5° C. When a solution of this material in chloroform was brought into contact with paper coated with resin or clay, a bright orange color was obtained.

EXAMPLE X

Preparation of 1',3',4'-trimethyl-6'-benzylamino fluoran

A mixture of 33.1 g. (0.1 mole) 4-benzylamino-2-hydroxy-2'-carboxybenzophenone, 13.6 g. (0.1 mole) 2,3,5-trimethylphenol and 200 ml. of 78% sulfuric acid was established in an ice bath, permitted to warm to room temperature and stirred for 2 hours. The reaction mixture was poured into ice and toluene and the mixture was made basic by addition of ammonia and ice. The basic mixture was extracted using toluene. The toluene was washed with water, concentrated, decanted from a small amount of water and diluted with petroleum ether. The resultant precipitate was dried to yield 14.6 g. (30.6%) of material exhibiting a melting point of 182°–185° C. Calc'd. percentages for $C_{30}H_{25}NO_3$: C, 80.51; H, 5.63; N, 3.13. Found percentages: C, 80.76; H, 5.73; N, 2.98. A solution of this material gave a bright orange color when brought into contact with paper coated with resin or clay.

EXAMPLE XI

Preparation of 1',2',3'-trimethyl-6'-cyclohexyl-aminofluoran

A mixture of 33.8 g. (0.1 mole) 4-cyclohexylamino-2-hydroxy-2'-carboxybenzophenone, 13.6 g. (0.1 mole) 3,4,5-trimethylphenol and 200 ml. of 78% sulfuric acid were heated on a steam bath to about 90° C. and stirred for about 16 hours. The reaction mixture was poured into water, 300 ml. of toluene was added and the mixture was made basic by addition of concentrated ammonia. The basic mixture was extracted using toluene. The toluene was washed with dilute aqueous ammonia and then with saturated sodium chloride. The toluene was dried and concentrated and the residue was taken up in chloroform and chromatographed on alumina using toluene, toluene-ethyl acetate and ethyl acetate, in that order, to elute. The orange eluant was recrystallized from toluene and exhibited a melting point of 224°–225°C. Calc'd. percentages for $C_{29}H_{29}NO_3$: C, 79.24; H, 6.65; N, 3.19. Found percentages: C, 79.33; H, 6.45; N, 3.29.

EXAMPLE XII

Preparation of 1',3',4'-trimethyl-6'-cyclohexylaminofluoran

A mixture of 33.8 g. (0.1 mole) 4-cyclohexylamino-2-hydroxy-2'-carboxybenzophenone, 13.6 g. (0.1 mole) 2,3,5-trimethylphenol and 200 ml. of 78% sulfuric acid were combined at about 0°–5°C. and were allowed to stir at about 50°C. overnight. The reaction product separation was conducted in the same way as the separation of Example XI, above.

Although this invention has been described in considerable detail, it must be understood that such detail is for the purpose of illustration only and that many variations and modifications can be made by one skilled in the art without departing from the scope and spirit thereof.

What is claimed is:
1. The compound 1',3',4'-trimethyl-6'-benzylaminofluoran.
2. The compound 1',2',3'-trimethyl-6'-benzylaminofluoran.

* * * * *